United States Patent [19]

Shaw

[11] Patent Number: 5,297,224
[45] Date of Patent: Mar. 22, 1994

[54] OPTICALLY SWITCHED SENSOR ARRAY

[75] Inventor: H. John Shaw, Stanford, Calif.

[73] Assignee: Litton Systems, Inc., Beverly Hills, Calif.

[21] Appl. No.: 930,581

[22] Filed: Aug. 14, 1992

[51] Int. Cl.$^5$ .............................................. G02B 6/02
[52] U.S. Cl. ........................................ 385/12; 385/16; 385/24; 250/227.27; 356/345; 367/153; 359/139; 359/141
[58] Field of Search .......................... 385/12, 16, 24; 250/227.12, 227.19, 227.27, 227.28; 356/345; 367/79, 131, 153; 359/123, 128, 139, 141, 173

[56] References Cited

U.S. PATENT DOCUMENTS

| | | | |
|---|---|---|---|
| 4,138,196 | 2/1979 | Redman | 356/350 |
| 4,632,551 | 12/1986 | Pavlath | 356/345 |
| 4,775,216 | 10/1988 | Layton | 385/12 |
| 4,799,797 | 1/1989 | Huggins | 356/345 |
| 4,848,906 | 7/1989 | Layton | 356/345 |
| 5,011,262 | 4/1991 | Layton | 385/12 |
| 5,039,221 | 8/1991 | Layton et al. | 356/345 |
| 5,071,214 | 12/1991 | Jacob et al. | 385/12 |
| 5,091,984 | 2/1992 | Kobayashi et al. | 385/16 |
| 5,140,154 | 8/1992 | Yurek et al. | 250/227.12 |
| 5,227,857 | 7/1993 | Kersey | 356/345 |

OTHER PUBLICATIONS

Colbourne et al., Electronics Letters, vol. 24, No. 6, Mar. 17, 1988, "Recovery Time for a Silicon Waveguide All-Optical Switch", pp. 303-304.
Normandin et al., Can. J. Phys., vol. 67, 1989, "All-optical silicon based, fiber optic modulator using a near cutoff region", pp. 412-419.
Cheng et al., Appl. Physics Letters, vol. 59, No. 18, Oct. 28, 1991, "Optically activated, integrated optic Mach-Zehnder interferometer on GaAs," pp. 2222-2224.
Pantell et al., Paper to be published in Optics Letters issue of Jul. 15, 1992, Feb. 20, 1992, "Laser-diode-pumped nonlinear switch in erbium-doped fiber", pp. 1-7.

Primary Examiner—Frank Gonzalez

[57] ABSTRACT

A fiber optic array having a plurality of subarrays of optical sensors, the subarrays being spaced apart along and optically connected to input and output buses through associated input and output optically actuated optical switches in series in the input and output buses. First and second light signal pulse trains are applied to one and other ends of the input bus and a third light signal pulse train is applied to one end of the output bus. The input switches are sequentially responsive to each first light signal pulse on the input bus for passing to an associated subarray a pulse of second light signal that is simultaneously present at that input switch such that second light signal pulses of the same magnitude are applied to each subarray. Associated output switches are sequentially responsive to third light signal pulses for passing trains of second light signal pulses from the arrays onto the output bus and to processing equipment.

23 Claims, 6 Drawing Sheets

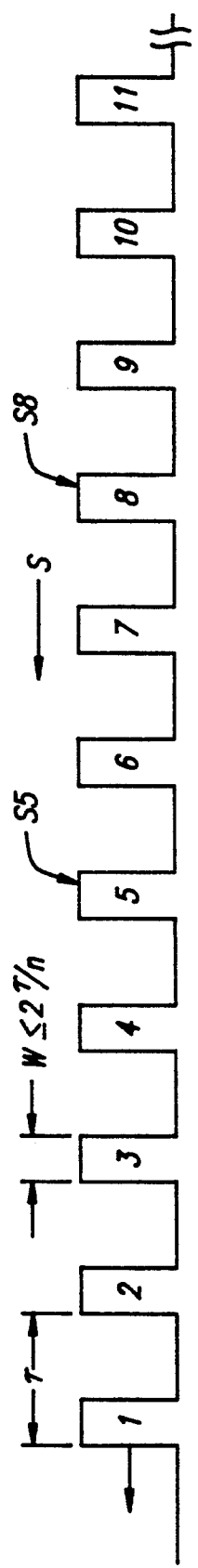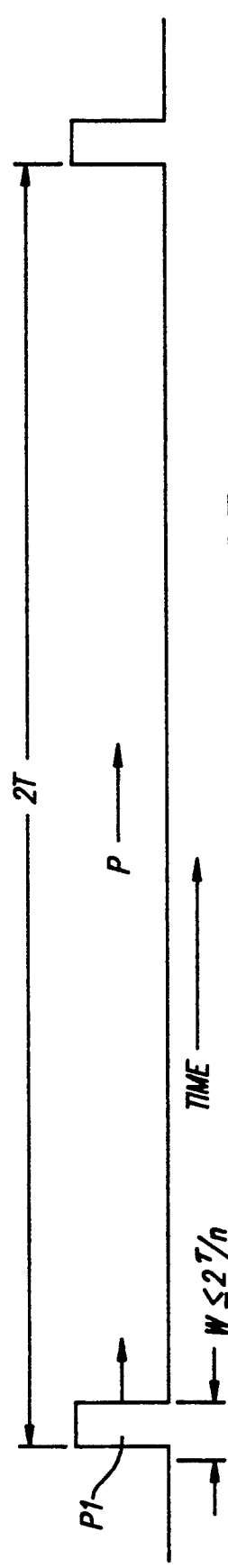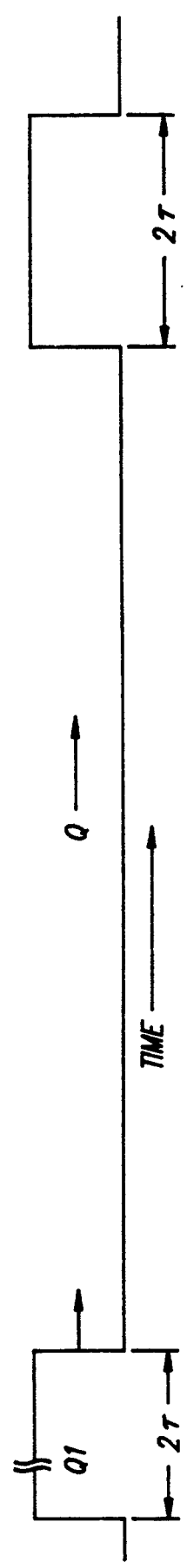
FIG. 2A
FIG. 2B
FIG. 2C

DISTANCE →
(LEFT TO RIGHT ALONG FIBERS 14 & 16)

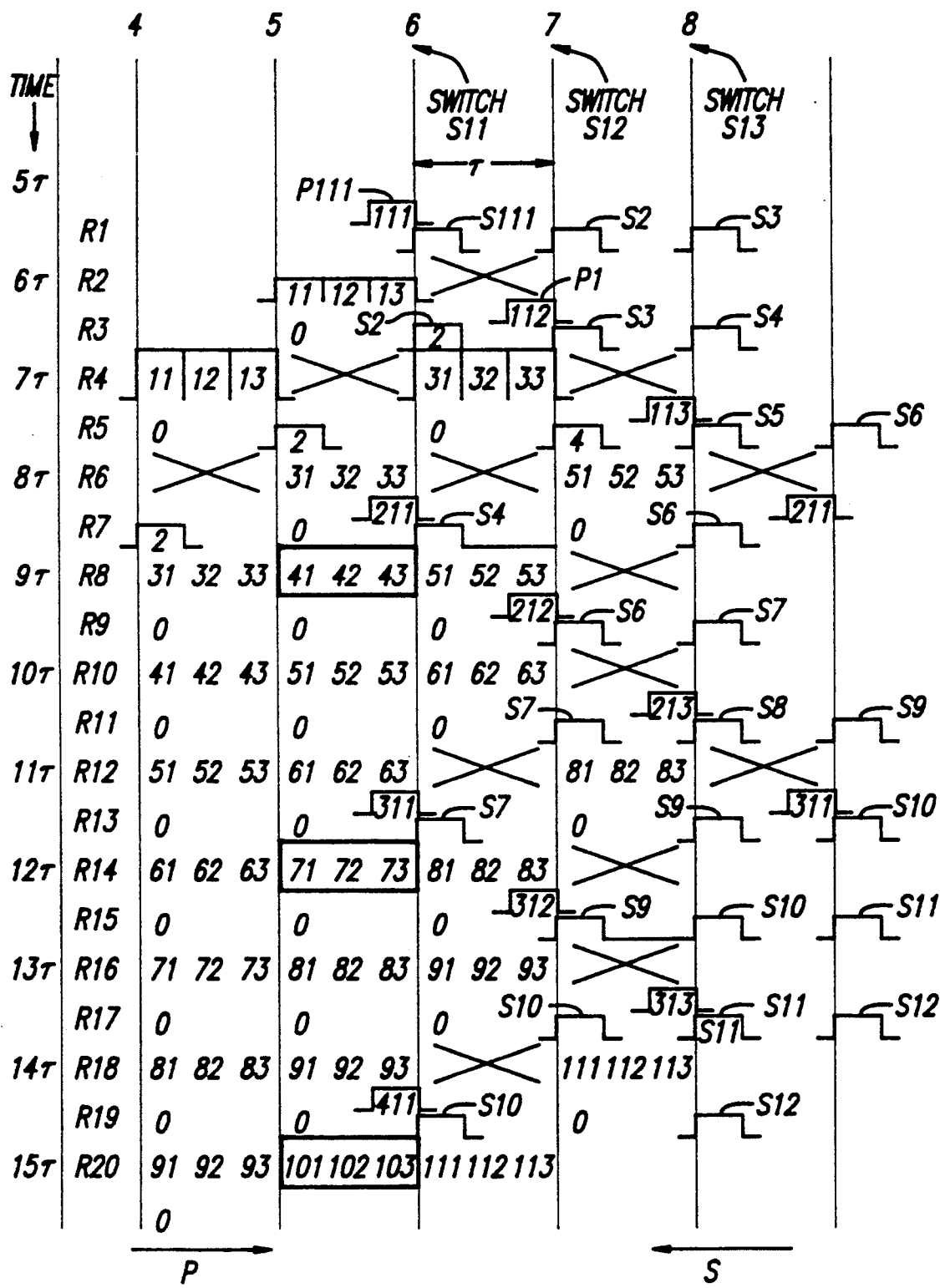

OPTICALLY SWITCHED SENSOR ARRAY

BACKGROUND

This invention relates to distributed fiber optic sensor arrays such as are employed in shipboard hydrophone systems for sensing changes in physical phenomena and more particularly to the provision of a system employing distributed arrays of optically switched fiber optic sensor arrays.

A conventional fiber optic hydrophone array that is immersed in water and pulled behind a ship for sensing acoustic vibrations in the water generally comprises a plurality of spaced apart (i.e., distributed) fiber optic sensors connected in series or in a ladder configuration or in a matrix configuration. In practice, several hydrophone arrays are connected in series behind the vessel with a number of input and output fiber optic buses being required and extending back to processing equipment on the towing vessel for each array or subarray. Such fiber optic sensor arrays are well known in the art, being described in publications and patents such as: U.S. Pat. No. 4,632,551, issued Dec. 30, 1986 for Passive Sampling Interferometric Sensor Arrays by G. A. Pavlath; U.S. Pat. No. 4,697,926, issued Oct. 6, 1987 for Coherent Distributed Sensor and Method Using Short Coherence Length Sources by R. C. Youngquist, etal; U.S. Pat. No. 4,699,513, issued Oct. 13, 1987 for Distributed Sensor and Method Using Coherence Multiplexing of Fiber-Optic Interferometeric Sensors by Janet L. Brooks, etal; U.S. Pat. No. 4,770,535, issued Sep. 13, 1988 for Distributed Sensor Array and Method Using a Pulse Signal Source by B. Y. Kim, etal; U.S. Pat. No. 4,789,240, issued Dec. 6, 1988 for Wavelength Switched Passive Interferometric Sensor System by I. J. Bush; U.S. Pat. No. 4,818,064, issued Apr. 4, 1989 for Sensor Array and Method of Selective Interferometric Sensing by Use of Coherent Synthesis by R. C. Youngquist, etal; U.S. Pat. No. 4,889,986, issued Dec. 26, 1989 for Serial Interferometric Fiber-Optic Sensor Array by A. D. Kersey, etal; U.S. Pat. No. 5,011,262, issued Apr. 30, 1991 for Fiber Optic Sensor Array by M. R. Layton; and U.S. Pat. No. 5,039,221, issued Aug. 13, 1991 for Interferometer Calibration for Fiber Optic Sensor Arrays by M. R. Layton, etal, which are incorporated herein by reference.

In a fiber optic ladder sensor array, for example, a different sensor is connected in each rung of a ladder structure having input and output fiber optic buses connected to opposite ends of each sensor. The input bus is connected to receive light from a single light source. Each input light pulse on the input bus is sequentially applied to each sensor through an associated directional coupler. The result is a diminution of the input light pulse at each sensor as the pulse progresses along the input bus of the array, the maximum number of distributed sensors of the array being determined by the minimum amount of light that can be passed on the output bus and detected by electronic equipment on the towing vessel. It is desirable to be able to increase the number of sensors that can be towed behind a vessel without increasing the number of optical buses required in the tow cable and without increasing the amount of processing equipment required on the towing vessel.

An object of this invention is the provision of an improved optical fiber hyrdrophone sensor array system. Another object is the provision of an optical fiber sensor array that requires fewer optical fiber buses than conventional arrays. Another object is the provision of an optical fiber sensor array or subarrays in which the optical input signal that is passed to distributed subarrays is not reduced in intensity as it passes the location of each subarray. Another object is the provision of an optical fiber sensor array in which separate input light pulses of substantially the same magnitude are applied to each subarray of the array. A further object is to increase the number of sensors driven by a single source.

SUMMARY OF INVENTION

In accordance with this invention, apparatus for sensing changes in a physical parameter comprises: an array of a plurality of subarrays of spaced apart optic sensors, each sensor being responsive to a physical parameter for sensing changes therein; an input optic bus having first and second light signals thereon; means responsive to the first light signal for selectively connecting the second light signal to ones of the subarrays; and means for monitoring output signals from the sensor subarrays for detecting changes in the physical parameter. In a particular embodiment of this invention the first and second light signals are applied to opposite ends of the input bus with sensor subarrays being spatially located along the input bus. The connecting means comprises a plurality of input optically actuated optic switches in series in the input bus at associated sensor subarrays. Each pulse of first light signal on the input bus successively actuates each input switch for passing to the associated sensor array a pulse of second light signal that is simultaneously present on the input bus at that input switch. Associated output optically actuated optic switches in an output optic bus are pulsed on in a similar manner by pulses of a third light signal on the output bus for passing trains of second light signal pulses from the subarrays to processing equipment. Consideration of this invention reveals that it increases the number of optic sensors that can be driven by a single optical source of second light signal since second light signal pulses of the same amplitude are applied to each of the subarrays. This invention has particular utility in applications including arrays and/or subarrays of as many as 1,000 or more very small diameter individual sensors and microlaser sources.

BRIEF DESCRIPTION OF DRAWINGS

This invention will be more fully understood from the following detailed description of preferred embodiments thereof together with the drawings in which:

FIGS. 2A, 2B and 2C are waveforms (as a function of time) illustrating input signal pulses S moving from right to left on input bus 14 in FIG. 1, input pump pulses P moving from left to right on the same input bus 14 in FIG. 1; and output pump pulses Q moving from left to right on output bus 16 in FIG. 1, respectively;

FIG. 7 is a spatial tabulation representation of input S and P pulses on input bus 14 and the resultant output pulses on line 16 at various times and locations of an input pump pulse P along the input bus 14 for an input pulse width W of $\leq \tau/n$ and $n=\tau=3$ for interleaved signal pulses.

DETAILED DESCRIPTION

Figure 1:
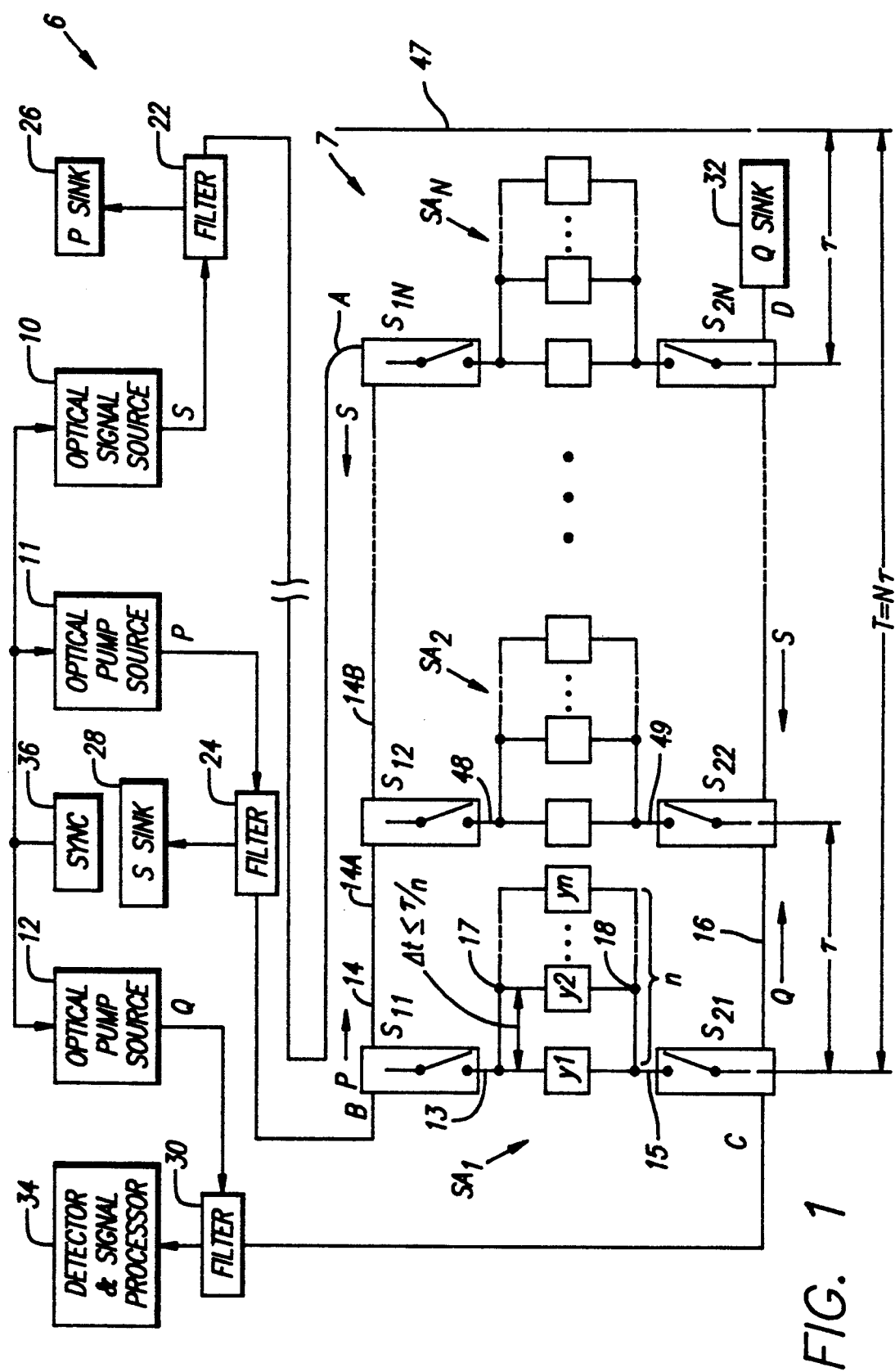
FIG. 1 is a schematic block diagram of a fiber optic sensor array architecture in accordance with this invention.

Referring now to FIG. 1, a preferred embodiment of this invention comprises equipment 6 located on a towing vessel and an array structure 7 in a towed cable. The equipment 6 is conventional and comprises sources 10 and 11 of input optical signal and pump pulses S and P for driving opposite ends A and B (the right and left ends in FIG. 1), respectively, of the input optical fiber bus 14. A third source 12 produces optical pump pulses Q which drive the left end C of output bus 16. Timing of sources 10-12 is controlled by a synchronization circuit 36. Output signal waveforms from sources 10, 11 and 12 are shown in FIGS. 2A, 2B and 2C, respectively, as a function of time. The frequencies of the pulses P and Q may be the same or different. The sources 10–12 may be semiconductor diode lasers with output frequencies corresponding to 0.8–0.9 or 1.3 or 1.9 microns, for example.

The array structure 7 comprises the input and output fiber optic buses 14 and 16, a plurality of N subarrays $SA_k$ and pluralities of N input and output optical switches $S_{1k}$ and $S_{2k}$ connecting opposite sides of associated subarrays to input and output buses 14 and 16, respectively, (where N is an integer, either odd or even, and k designates a particular switch location). The subarrays $SA_k$ are conventional and are spaced apart by a distance corresponding to a time interval $\tau$, as are adjacent and associated input and output switches. Each subarray comprises n sensors that are spaced apart corresponding to a delay time $\Delta t \leq \tau/n$. This means that $2\Delta t \leq 2\tau/n$ is the round trip delay time for a portion of an input signal pulse S on line 13 of a subarray such as $SA_1$ to travel through the sensor y2 and back to line 15. This assumes there is no delay in sensor y2. Individual sensors may be interferometric although this is not required. In practice the dots such as at 17 and 18 in $SA_1$ are directional couplers, although the direction couplers are not shown in FIG. 1 for conveience of illustration.

Referring now to FIGS. 2A and 2B, the input signal pulses S and input pump pulses P are applied to opposite ends of input bus 14 (right and left in FIG. 1, respectively) and output pump pulses Q in FIG. 2C are applied to the left end of output bus 16. The pulses S and P have pulse widths of $W \leq 2\tau/n$ which corresponds to the time delay for a signal pulse to travel from the input line for one sensor to and through and back from an adjacent sensor in the subarray. In contrast, the pulse width of output pump pulses Q is $2\tau$ to allow signal pulses to be emptied out of associated subarrays as is described more fully hereinafter. The pulse repetition frequency of pulses S in FIG. 2A is $1/\tau$ (row R2 of FIG. 5). The pulse repetition frequency of pulses S is preferably $1/(2\tau)$ here as is described more fully hereinafter and illustrated in row R13 in FIG. 5. Alternatively, the input signal S may be a continuous wave signal, although this is not preferred since it is a waste of optical power. The pulse repetition frequencies of the input and output pump pulses P and Q are both $1/(2T)$.

The lengths of the optical fibers and timing of the sources 10-12 are adjusted so that S pulses in FIG. 2A are incident on each input switch $S_{1k}$ on input bus 14 (moving from right to left) when P and Q pulses are applied to the first input and first output switches. This condition is illustrated in rows R2-R4 in FIG. 5. The input switches $S_{1k}$ operate such that when an input signal pulse S and an input pump pulse P are both simultaneously present on input bus 14 at an input switch then the switch bypasses all of that signal pulse S into the adjacent subarray and passes a substantial amount of that pump pulse P along the input bus to the next input switch. Conversely when only an input signal pulse S is present on the input bus at an input switch (i.e., the pump pulse P is absent from that input switch) then all of the signal pulse S is passed on the input bus through the input switch towards the next (left) input switch. The optical output switches $S_{2K}$ are similar, in that an output switch $S_{21}$ is responsive to an output pump pulse Q for passing signal pulses from the associated subarray $SA_1$ on line 15, for example, onto the output bus 16 and passing all signal pulses traveling from right to left on the output bus 16 to filter 30 and detector-processor 34. The optical output switches $S_{2k}$ are preferred over directional couplers for conserving optical power that would be wasted in the non-connected arms of the couplers.

Figure 3A:
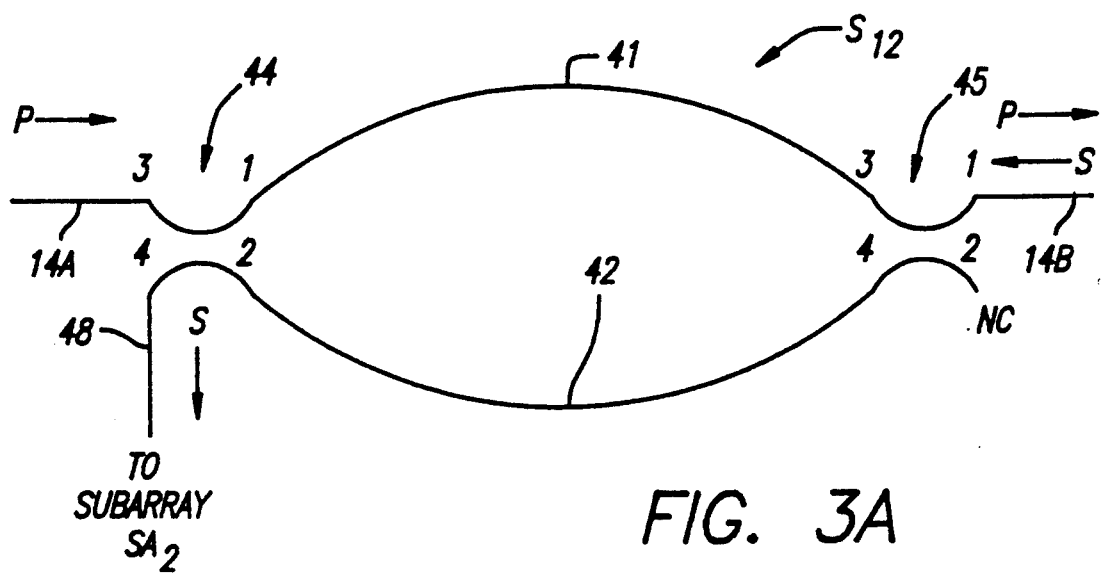
FIGS. 3A and 3B are schematic representations of Mach-Zehnder optically actuated optic switches that may be employed as the input and output optically actuated optic switches, respectively, in FIG. 1.
Figure 3B:
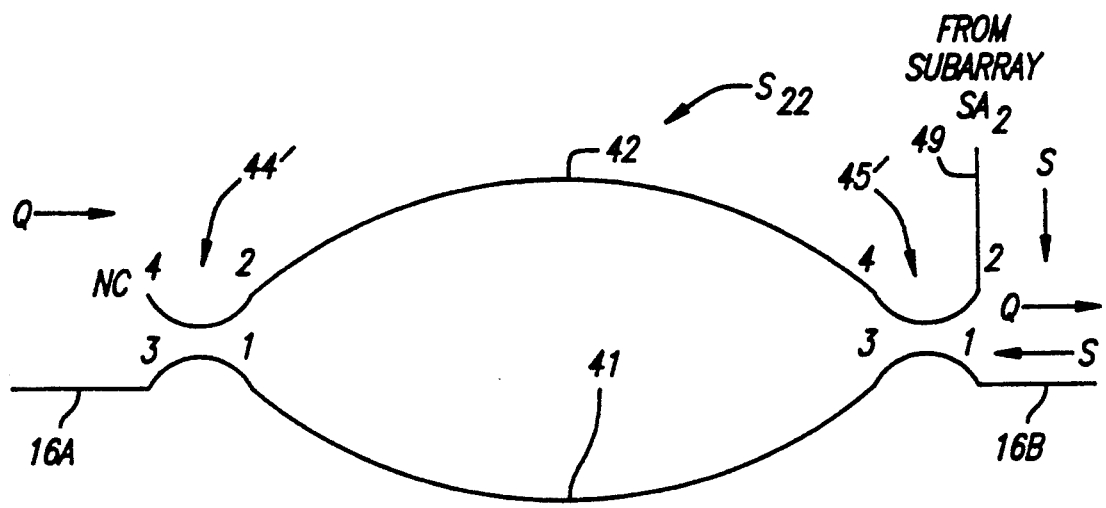
Figure 4:
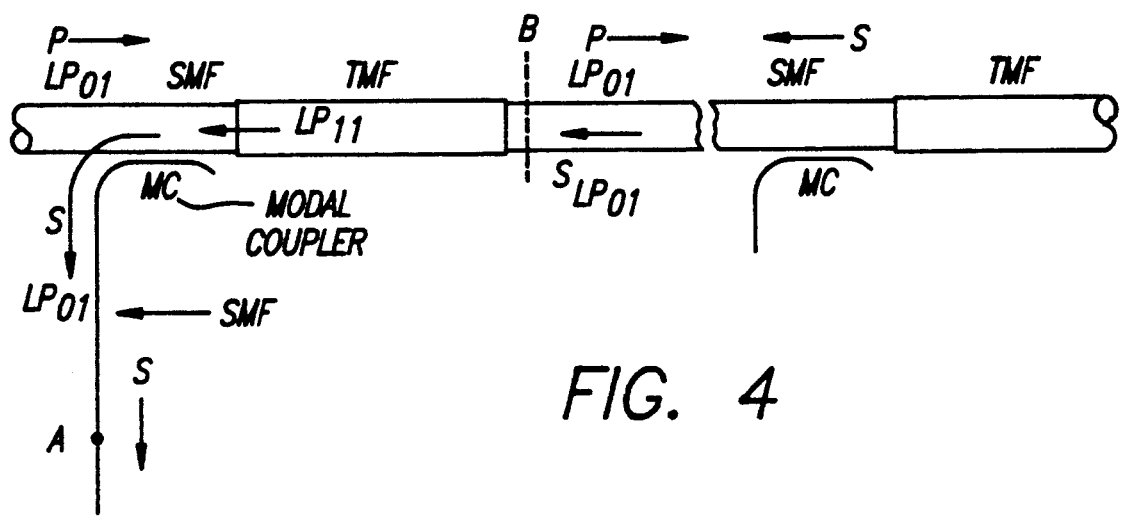
FIG. 4 is a schematic representation of a two mode fiber optic switch that may be employed as the input and output optic switches in the structure of FIG. 1.

Optically activated optical switches for switching optical signals have been described in the literature and are known to those skilled in the art. By way of example, the input and output switches $S_{1k}$ and $S_{2k}$ may be Mach-Zehnder switches of the type illustrated in FIG.'S 3A and 3B, respectively, and described in the publication "Optically Activated Integrated Optic Mach-Zehnder Interferometer on GaAs" by Z. Y. Cheng and C. S. Tsai, Applied Physics Letters 59(18) 28 Oct. 1991 pp. 2222-2224. Briefly, the optical switch $S_{12}$ in FIG. 3A comprises a pair of single mode optical fibers or integrated optic waveguide 41 and 42 connected between wavelength division multiplex (WDM) directional couplers 44 and 45. The line 41 is connected in series with the straight through ports 1-3 of the couplers in the single mode bus line 14. The other line 42 is connected in series between the coupled ports 2-4 of the couplers. The port 2 of coupler 45 has no connection to it. The port 4 of the coupler 44 is connected to subarray $SA_2$. The signal pulses are coupled to both lines 41 and 42. The pump pulses P are coupled to only one of lines 41 and 42 to cause a change in the refractive indexes of the waveguides in the couplers and the resulting $\tau$ phase shift and providing the desired operation, i.e., the requisite combining and separating of signals in the couplers for directing a signal S pulse into port 4 of coupler 44 and into the subarray $SA_2$. The structure and operation of the output switch $S_{22}$ in FIG. 3B is similar. Alternatively, the switches may be two mode fiber devices as is illustrated in FIG. 4 and described in U.S. Pat. Nos. 4,741,586 and 4,895,421 issued May 3, 1988 and Jan. 23, 1990, respectively, for Dynamic Couplers Using Two Mode Optical Wave guides by B. Y. Kim and H. J. Shaw which are incorporated herein by reference. Optically activated optical switches are also described in the publications and the patents: All-Optical Modulation in Gallium Arsenide Integrated Optical Waveguides by G. McWright, etal., SPIE Vol. 1038, Sixth Meeting in Israel on Optical Engineering (1988); Recover Time for A Silicon Waveguide All-Optical Switch, Electronics Letters 17 Mar. 1988, Vol. 24, No. 6, pp. 303-305; All-Optical, Silicon Based, Fiber Optic Modulator Using a Near Cutoff Region[1] by R. Normandin, etal., Can. J. Phys. 67, 412, 1989, pp. 412-419; U.S. Pat. No. 5,091,984 issued Feb, 25, 1992 for Optical Switch for use With Optical Fibers by Y. Kobiyashi, etal.; Laser-Diode Pumped Non-Linear Switch in Erbium-Doped Fiber by R. H. Pantel, etal., Optics Letters Jul. 15, 1992; "Optical Kerr Switch Using Elliptical Core Two-Mode Fiber" by H. G. Park, C. C. Pohalski and B. Y. Kim, Optics Letters, Volume 13, No. 9, pp 776-778, 9/88; "Picosecond Switching by Saturable Absorption in a Nonlinear Directional Coupler" by N. Finlayson, etal., Applied Physics Letters, vol. 53, No. 13, pp. 1144-1146, 9/88; "Use of Highly Elliptical Core Fibers for Two Mode Fiber Devices" by B. Y. Kim, etal., Optics Letters, Vol. 12, No. 9, pp 729-731, 9/87; "Strain Effects on Highly Elliptical Core Two Mode Fibers" by J. N. Blake, etal., Optics Letters, Vol. 12, No. 9, pp 732-734, 9/87, which are incorporated herein by reference.

In operation, input signal pulses S and input pump pulses P from sources 10 and 11 in FIG. 1 are coupled through associated optical filters 22 and 24 to opposite ends A and B of the input bus line 14. The output pump pulses Q are coupled from source 12 through filter 30 to the left end C of the output fiber 16. The filters 22 and 24 direct input pump and input signal pulses P and S outputted from opposite ends B and A of input bus 14 to associated energy sinks 26 and 28 and away from sources 10 and 11, respectively. Similarly, the filter 30 passes output pump pulses Q to output bus 16 and directs trains of output signal pulses at the end C of output bus 16 to the detector and signal processing circuitry 34 and away from source 12. The filters 22, 24, and 30 may be implemented with directional couplers or other fequency selective components. Timing of the pulses is adjusted so that a signal pulse S is present at each input switch $S_{1k}$ as is shown in FIG. 5, row R2, where the designations in row R1 are the spatial locations of the switches.

Figure 5:
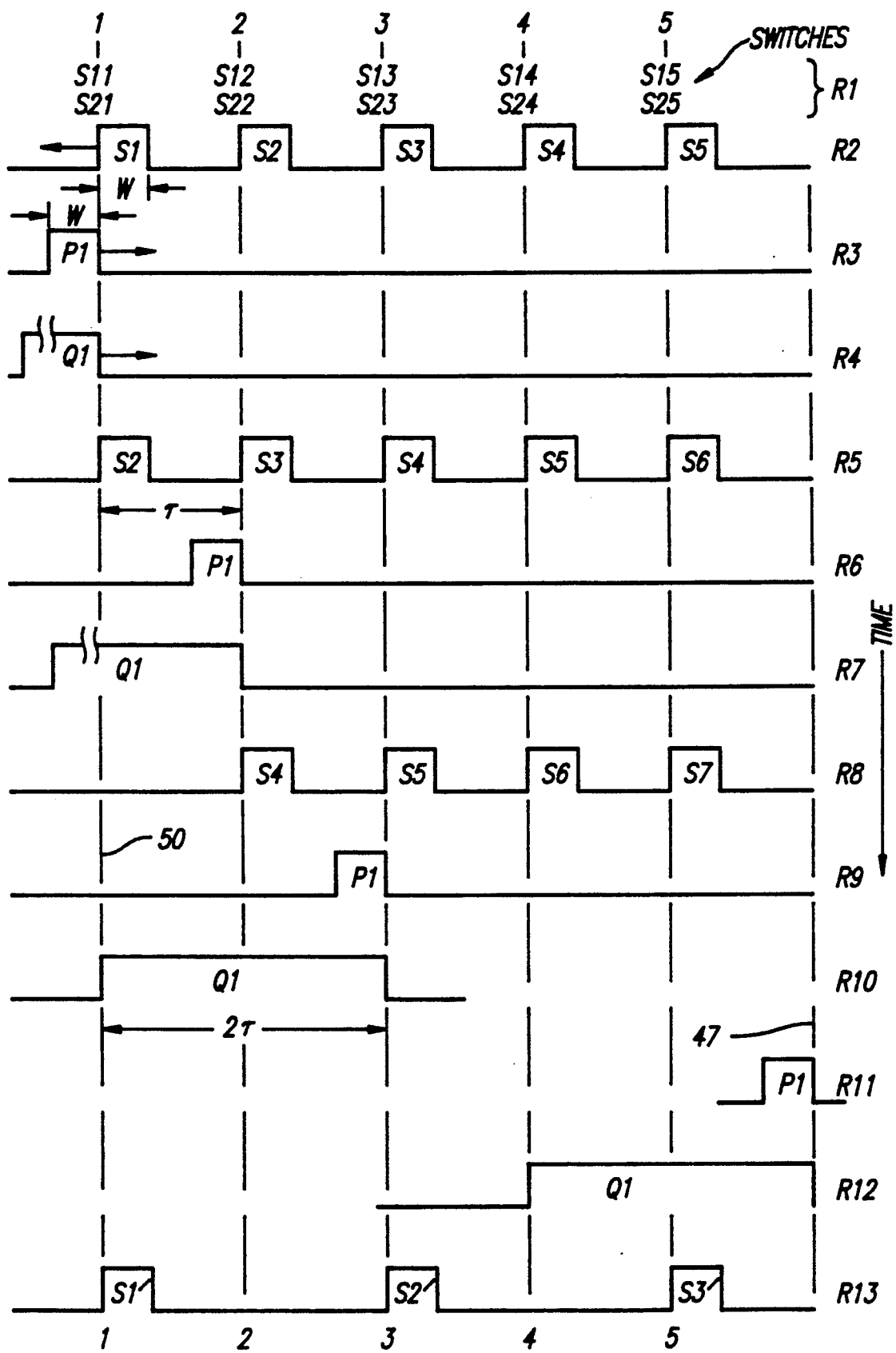
FIG. 5 is a diagrammatic representation of the operation of the system of FIG. 1 as a function of distance x along the array (from left to right in FIG. 1) illustrating the progression of S and P pulses (in opposite directions) and Q pulses along the array at different times that are spaced apart by $\tau$, where the vertical lines in FIG. 5 correspond to the physical locations of switches designated in row R1.

Consider now that signal pulses S on input bus 14 are present at each of the input switches $S_{1k}$ (R2 in FIG. 5), that a first pump pulse P1 is present at the same time on input bus 14 at only switch $S_{11}$ (R3 in FIG. 5), and that a first output pump pulse Q1 is present at the same time on output bus 16 at only output switch $S_{21}$ (R4 in FIG. 5). The pulses P1 and Q1 close switches $S_{11}$ and $S_{21}$ for time intervals $W=2\tau/n$ and $2\tau$, respectively, for example. This causes all of the first signal pulse S1 at input switch $S_{11}$ to pass into only the subarray $SA_1$. The signal pulse S1 is sequentially passed by way of coupled signal pulses S1 of decreased intensity through the sensors y1, . . . ,yn in the conventional manner, with a time division multiplexed output pulse train of $S1_{y1}$, . . . ,$S1_{yn}$ pulses being passed by output switch $S_{21}$ to processor 34 over a time duration $2\tau$. After only a time interval $\tau$, however, the pump pulse P1 advances to and closes the second input switch $S_{12}$ (R6 in FIG. 5). This causes the signal pulse S3, now at the second input switch $S_{12}$ (R5 in FIG. 5), to be passed into and be operated on by subarray $SA_2$ in the same manner. At the same time the output pulse Q1 is advanced down the output bus 16 and causes the second output switch $S_{22}$ (R7 in FIG. 5) to close and pass a time division multiplexed output of input signal pulses S from subarray $SA_2$, through output switch $S_{22}$ and bus 16 to the processor 34. Since the output pump pulse Q1 is $2\tau$ long, however, this means that trains of output signal pulses are simultaneously outputted from subarrays $SA_1$ and $SA_2$ through associated switches $S_{21}$ and $S_{22}$ over the same time interval $\tau$ onto the same output bus 16. These pulse trains do not overlap, however, because of the time delay $\tau$ in the length of output fiber 16 between the adjacent subarrays (adjacent output switches) in FIG. 1. This operation continues with this first pump pulse P1 sequentially causing alternate (odd numbered) input signal pulses S in FIG. 2 and R2 of FIG. 5 to be passed into consecutive switches and subarrays. Note that the signal pulse S3 is absent from R8 at $S_{11}$ (line 50) in FIG. 5 since substantially all of S3 was bypassed by input switch $S_{12}$ into subarray $SA_2$ during the previous time interval $\tau$ (row R5).

After a time period $T=N\tau$ the first input pump pulse P1 has progressed to the vertical line 47 in FIG.'S 1 and 5 (R11 in FIG. 5). At this time the output bus 16 is filled with trains of signal pulses from the k subarrays and the output pump pulse Q1 will still be present on output bus 16 for an additional time interval $\tau$ (R12 in FIG. 5). This means that a time delay of $T=N\tau$ is now required to empty the output bus 16 before the next input pump pulse P2 is applied to input bus 14 and the first switch $S_{11}$.

Reference to FIG. 5 reveals that only alternate signal pulses S are ever passed to the subarrays $SA_k$. Thus, the pulse repetition frequency of the signal pulses S is preferably $\frac{1}{2}\tau$ in order to produce signal pulses only at alternate switches as is shown in R13 of FIG. 5. This causes each input signal pulse S' to be passed to an associated subarray $SA_k$. The trains of input signal pulses outputted by the subarrays are processed by the circuit 34 in the conventional manner for obtaining information about changes in parameters such as the angle of arrival and the intensity of acoustic waves in the water.

Figure 6:
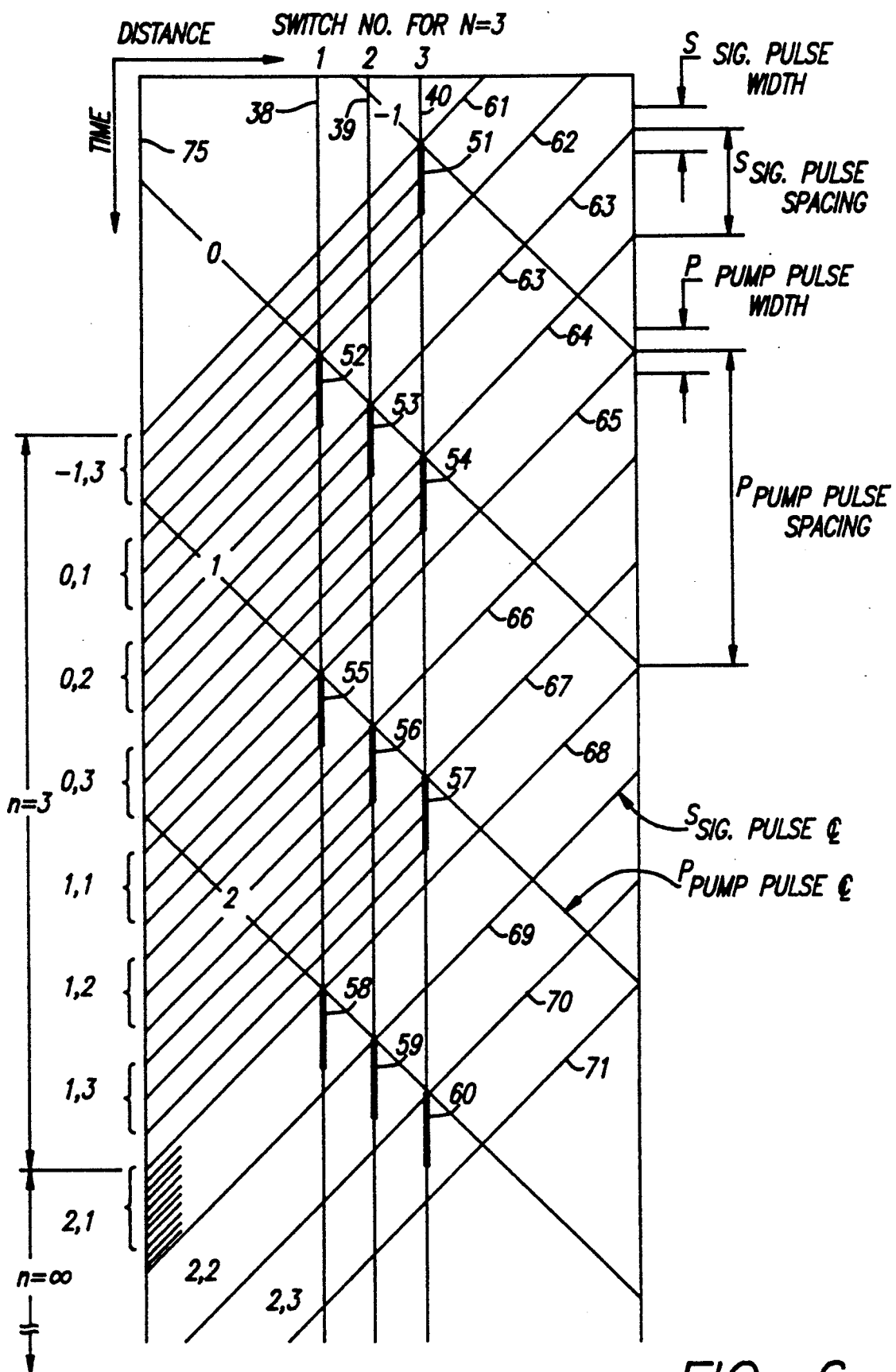
FIG. 6 is a diagrammatic representation of the operation of the system of FIG. 1 for noninterleaved signal puslses with distance x along the array (left to right in FIG. 1) and time being plotted along the x and y axes, respectively; with input signal pulses S and input pump pulses P being along lines at +45 degrees and −45 degrees, respectively; with switch locations being indicated by vertical lines 38, 39 and 40 for N=3, the interaction of successive signal and pump pulses with individual switches producing output pulses whose center lines extend over the time intervals shown by the short dark vertical lines (e.g. 52-54) on the lines 38–40; with center lines of output pulses being shown on the left most line 75 here.

This operation is also illustrated by the graphic representations in FIG. 6 where distance along the array is plotted along the x axis (increasing to the right) and time is applied along the $-y$ axis (increasing downward). The center lines of input signal pulses S and input pump pulses P are represented by the lines at +45 degrees and −45 degrees, respectively; with the spacing of signal and pump pulses and the width of signal and pump pulses being designated at the right side of FIG. 6. The spatial locations of the switches are represented by the light vertical lines 38-40 for N=3, with the solid vertical line segments at 51-54, for example, representing coincidence of input signal pulses and input pump pulses at associated switches. The output signals from the array are indicated on the vertical line 75 on the left side of FIG. 6 for n=3 and n=infinity where the first and second numerals designate the particular pump pulse P and switch causing the associated output signal pulse train. By way of example, starting from the top of the FIG. 6 the signal pulse line 61 at +45 degrees and pump pulse −1 at −45 degrees are coincident at input switch $S_{13}$ at line 51 for producing the output signal pulse train at −1, 3 on the left line 75. Similarly, the input signal pulses 62, 63 and 64 are coincident with the same input pump pulse 0 at successive input switches $S_{11}$, $S_{12}$ and $S_{13}$ at line segments 52, 53 and 54, respectively, for producing trains of output pulses at 0,1 and 0,2 and 0,3 on line 75. Subsequent signal and input pump pulses are also coincident at the same switches as is illustrated here.

The operation of this invention will now be described analytically. In this description signal pulses S, P and Q are designated by lower case letters s, p and q, respectively. The time $t_{p,k}$ for an input pump pulse p (where p=1,2 ...) to reach an input switch $S_{1k}$ (for k=1,2 ... N) from the first input switch $S_{11}$ at k=1 is $$t_{p,k} = [k-1+(p-1)2N]\tau \tag{1}$$

This is of the form $t_{p,k} = k\tau$ plus terms that are independent of k. It represents progration of a pump pulse p to the right along the input line 14. Here k is the normalized distance along the line 14; i.e., k=x/d where d is the distance ($\tau$) between adjacent switches and x is linear distance along the input bus 14 at a particular point in time. From Eq. (1), the time interval $\tau$ for a pump pulse p to travel between two adjacent switches such as $S_{11}$ and $S_{12}$ is $$t_{p,k+1} - t_{p,k} = \tau \tag{2}$$

Also, the time interval between successive pump pulses is $$t_{p+1,k} - t_{p,k} = 2N\tau \tag{3}$$

where N is the maximum value of k, i.e., the total number of sub-arrays.

The time $t_{s,k}$ for signal pulse s to reach switch $S_{1K}$ from the last input switch $S_{1N}$ (where time at switch $S_{11}$ for K=1 is taken as a reference at which $t_{s,k}=0$) is $$t_{s,k} = (2s-k-1)\tau \tag{4}$$

This Eq. (4) is of the form $t_{s,k} = -k\tau$ plus terms independent of k. This represents propagation of a signal pulse s to the left along the input bus 14. The time $\tau$ for a signal pulse s to travel between adjacent switches is $$t_{s,k} - t_{s,k+1} = \tau \tag{5}$$

Assuming N=5, then from Eq. (4) it is clear that the first input pulse s=1 reaches the last input switch $S_{1,N} = S_{1,5}$ for k=N=5 at time $t_{1,N} = -4\tau$; the time for the first input pulse s=1 to reach the next to last input switch $S_{1,N-1} = S_{1,4}$ is $t_{1,N-1} = -3\tau$; and the reference time for the first input pulse s=1 to reach the first input switch $S_{11}$ is $t_{1,1} = 0$. The time between two successive signal pulses s is $$t_{s+1,k} - t_{s,k} = 2\tau \tag{6}$$

The time $t_{p,s,k}$ for coincidence of a pump pulse p and a signal pulse s at a switch k is where $t_{p,s,k} = t_{s,k} = t_{p,k}$, i.e., for values of s,p and k which satisfy the relationship $$s = k + (p-1)N \tag{7}$$

This Eq. (7) shows that an individual pump pulse (fixed value of p) encounters N consecutive signal pulses, corresponding to the N values of k. This Eq. (7) also accounts for repeated scanning of the array. For a pump pulse p and a switch at k=N, then s=pN while for the next pump pulse p+1 and the first switch at k=1, then s=pN+1. Thus, following a collision at the last switch $S_{1N}$ by one set of pump and signal pulses, the next collision takes place at the first switch $S_{11}$ by the next successive pump and signal pulses following a time delay of $N\tau$ which is required for the output bus 16 to clear. Stated differently, the time difference between the arrival of the pump pulse p+1 at switch $S_{11}$ and the arrival of the prior pump pulse p at switch $S_{1N}$ is, from Eq.(1), $$t_{p+1,1} - t_{p,N} = (N+1)\tau \tag{8}$$

which provides the proper clearing time $N\tau$ for output bus 16. The clearing time may also be $(N+1)\tau$.

Again referring to FIG. 1, in an oceanic sonic exploration application such as is described here the hydrophone sensor array 7 is towed behind a ship on which the optical sources, detectors and processing equipment at 6 are located. This means that optical fiber buses must run between the ship and the various towed arrays. It is desirable to keep the number of fiber buses to a minimum. In a prior art system including N subarrays $SA_1$, ..., $SA_N$ of the type illustrated in FIG. 1, it would require a minimum of N pairs of optical fiber buses extending between the ship and the arrays. In accordance with this invention in FIG. 1 these N subarrays require only 3 optical fiber buses between the ship and the array 7 of N subarrays (input optical bus 14 is essentially two fiber buses since it extends from the ship to the array and back to the ship). The advantages provided by this invention in reducing the optical fiber bus count will now be illustrated analytically.

Consider that n is the maximum number of elements (sensors) in a conventional prior art subarray that can be powered from a single input pulse. Then let a block be a contiguous or series connected group of m subarrays. This means that a block includes mn sensor elements. Consider further that an array contains M/mn blocks, where M is the total number of elements in the array. In accordance with this invention only 3 fiber buses are required for each block. This means that only 3 M/mn buses are required for an entire array, which reduces to 3 M/n² optical fiber buses where m=n.

In contrast, conventional arrays (or subarrays) require one input bus and one output bus for each subarray. This means that each of the aforementioned blocks requires 2 m optical fiber buses and that each array requires 2 m (M/mn)=2 M/n buses. This is also the number of optical fiber buses required when each block in a conventional square array of n×n (where m=n) elements.

The ratio R of the number of fiber buses required for a conventional array to the number of buses required for an array in accordance with this invention is $$R = (2 M/n)/(3 M/mn) = 2 m/3. \tag{9}$$

This means that 2 m/3 more optical fiber buses are required for a conventional array than for a similar array in accordance with this invention.

Consider for example that m=n=12 elements such that R=2 n/3=8. This means that a conventional array requires 8 times as many optical fiber buses as an array in accordance with this invention. Consider further that there are 12 blocks in the entire array. This means that the total number M of elements or sensors in the array is M=12 mn=$12^3$=1728, for n=m; and that a conventional array will require 2 M/n=288 optical fiber buses whereas an array in accordance with this invention will require only 3 M/$n^2$=36 optical fiber buses, which is a significant advantage.

In an alternate embodiment of this invention illustrated in FIG. 7, the pulse widths of the input signal and input pump pulses are $\leq \tau/n$ and the PRF of signal pulses is $1/\tau$. In this embodiment the spacing $\Delta t$ in FIG. 1 is made $\Delta \tau \leq \tau/2$ n. The PRF's of input and output pump pulses P and Q are then 1/T (i.e., no delay is required to empty output bus 16 between input pump pulses) since the structure will interleave outputs of subarrays as is illustrated in FIG. 7 for $\tau=n=3$.

In the tabulation in FIG. 7 time increases downward with 2 rows being dedicated to each point in time such as at $6\tau$ and rows R2-R3 and at $7\tau$ and rows R4-R5. The vertical lines are spaced apart a distance corresponding to a time interval $\tau$ with input switches $S_{11}$ and $S_{12}$ and $S_{13}$ being located at lines at 6 and 7 and 8 here. The columns are convenient time slot representations of the status of pulses on the input and output buses with P and S pulses moving left to right and right to left, respectively, in FIG. 7. Row R1 shows the status of input P and S pulses on bus 14 at the end of a time interval $5\tau$, where P and S pulses are simultaneously present at switch $S_{11}$ during the next time interval $\tau$. The legend P111 designates a first pump pulse P1 at the input switch $S_{11}$. Similarly, the legend S111 designates a first signal pulse S1 at the input switch $S_{11}$. Row R3 shows the status of P and S pulses on input bus 14 at one $\tau$ later, at the end of $6\tau$, with P1 and S3 (i.e., P112 and S312) being coincident at input switch $S_{12}$. Row R2 shows the S output pulses that are passed by subarray $SA_1$ onto output bus 16 during the time interval $6\tau$. Since input pump and signal pulses are not simultaneously present at switch $S_{12}$ in row R1 at this time, however, there are no S output pulses on output bus 16 in row R2 during this time interval. This state is represented by an x in row R2.

Comparison of rows R2 and R4 reveals that these output signal pulse representations are advanced to the left by one time slot $\tau$ on the output bus 16 during each time interval $\tau$. The 0's in row R5, for example, indicate that there are no signal pulses S1 and S3 on input bus 14 since they were previously passed to subarrays $SA_1$ and $SA_2$ as is shown in rows R2 and R4, respectively. The second x in row R6 reveals that there is another time interval $\tau$ at $8\tau$ where there are no S pulses outputted onto the output bus 16. Row R7 reveals that input pump and signal pulses P2 and S4 are simultaneously present at input switch $S_{11}$, however, at the end of $8\tau$. This means that an associated train of S pulses will appear on output bus 16 at the end of $9\tau$ as is illustrated in row R8 by the pulses 41, 42 and 43 where the numeral 4 means that the output S pulses are caused by the input signal pulse S4 on the input bus and the second numerals 1-3 mean that the pulses on the output bus are associated with the first, second and third sensors, respectively, of the subarray $SA_1$. Thus, after a short start-up time, it is seen that the system interleaves output signal pulses S from various subarrays. This stuffing or interleaving is indicated by the dark boxes here. The signal pulses outputted on output bus 16 are deinterleaved in the processor 34 in the conventional manner.

Although this invention is described in relation to preferred embodiments thereof, variations and modifications will be apparent to those skilled in the art. By way of example, the source 20 may produce a continuous wave (CW) output optical input signal that is applied to the end A of the input bus 14. This CW signal is converted to signal pulses S by the operation of the input pump pulses P and the input optical switches $S_{1k}$. Further, the spacing between adjacent subarrays and switches may be $2\tau$ such that a delay time of $(N+1)\tau$ is no longer required since outputs of subarrays for some pump pulses will be interleaved with those of subsequent pump pulses. Additionally, input and output switches may be associated with individual sensors instead of arrays thereof. Also, different sensors may be sensitive to different physical parameters. Additionally optically activated optic switches may be employed in place of the directional couplers in the subarrays such as at dots 17 and 18 in $SA_1$. This invention will therefore be defined by the attached claims.

What is claimed is:

1. Apparatus for sensing changes in a physical parameter comprising:
   means for generating first and second light signals;
   a plurality of arrays of optic sensors that are responsive to a physical parameter for sensing changes therein;
   means responsive to said first light signal for selectively connecting said second light signal to ones of said arrays; and
   means for monitoring output signals of said plurality of sensor arrays for detecting changes in the physical parameter.

2. Apparatus according to claim 1 wherein said sensor arrays are passive interferometric sensor arrays.

3. Apparatus according to claim 1 wherein said connecting means is responsive to said first light signal for sequentially connecting said second light signal to different ones of said arrays.

4. Apparatus according to claim 3 wherein said connecting means is responsive to said first light signal for sequentially connecting said second light signal to different ones of said arrays such that pulses of second light signal of substantially the same magnitude are sequentially connected to said arrays.

5. Apparatus according to claim 4 wherein said generating means produces a first light signal that is a first train of first light signal pulses, said connecting means being sequentially responsive to the same first light pulse over a period of time for selectively connecting at least portions of said second light signal of substantially the same magnitude to different ones of said arrays.

6. Apparatus according to claim 5 wherein said generating means produces a second light signal that is a second train of second light signal pulses, said connecting means being sequentially responsive to the same first light pulse over a period of time for selectively connecting second light pulses of substantially the same magnitudes to associated ones of said arrays.

7. Apparatus according to claim 6 further comprising a transmit optical fiber; said connecting means comprising first means for coupling said first and second trains of light pulses to one and other ends of said transmit fiber; and a plurality of first optically actuated optic switches connected in series in said transmit fiber and each connected to an input side of an associated sensor array, said first switches being responsive to first light pulses traveling in one direction on said transmit fiber for passing to an associated sensor array an associated second light pulse traveling in the other direction on said transmit fiber when a first light pulse and a second light pulse are simultaneously present on said transmit fiber at said first switch.

8. Apparatus according to claim 6 further comprising a transmit optical fiber; said connecting means comprising first means for coupling said first and second trains of light pulses to one and other ends of said transmit fiber; and a plurality of first optically actuated optic switches connected in series in said transmit fiber and each connected to an input side of an associated sensor array, said first switches being sequentially responsive over a period of time to the same first light pulse traveling in one direction on said transmit fiber for sequentially passing to associated sensor arrays associated second light pulses traveling in the other direction on said transmit fiber when a first light pulse and a second light pulse are simultaneously present on said transmit fiber at said first switch.

9. Apparatus according to claim 8 wherein said monitoring means comprises: second generating means producing a third train of third light pulses; a receive optical fiber; second means coupling said third train of light pulses to one end of said receive fiber; and a plurality of second optically actuated output optic switches connected in series in said receive fiber and each connected to an output side of an associated sensor array, said second switches being responsive to third light pulses traveling in one direction on said receive fiber for passing from the associated sensor array and onto said receive fiber a train of second light pulses from the associated array traveling in the other direction.

10. Apparatus according to claim 8 wherein said monitoring means comprises: second generating means producing a third train of third light pulses; a receive optical fiber; second means for coupling said third train of light pulses to one end of said receive fiber; and a plurality of second optically actuated output optic switches connected in series in said receive fiber and each connected to an output side of an associated sensor array, said second switches being sequentially responsive over a period of time to the same third light pulse traveling in one direction on said receive fiber for sequentially passing from one or more associated sensor arrays and onto said receive fiber trains of second light pulses from the associated arrays traveling in the other direction.

11. Apparatus according to claim 10 wherein the pulse widths of the first and second pulses are $\leq 2\tau/n$, where $\tau$ is the delay time between adjacent switches and n is an interger corresponding to the number of sensors in each sensor array in said apparatus.

12. Apparatus according to claim 11 wherein the pulse widths of third pulses is $2\tau$ and the pulse repetition frequencies of first and third pulses are $1/(2T)$ where $T=N\tau$ and N is an interger corresponding to the number of arrays in said apparatus.

13. Apparatus according to claim 12 wherein the pulse repetition frequency of second pulses is $1/(2\tau)$.

14. Apparatus according to claim 10 wherein the pulse widths of first and second pulses are both $\leq \tau/n$ and the pulse repetition frequencies of first and second pulses are $1/\tau$ and $1/T$, respectively, where $\tau$ is the delay time between adjacent switches, n is an integer corresponding to the number of sensors in each sensor array, $T=N\tau$, and N is an integer corresponding to the number of arrays in said apparatus.

15. Apparatus according to claim 14 wherein the pulse width and pulse repetition frequency of third pulses are $2\tau$ and $1/T$, respectively.

16. Apparatus for sensing changes in a physical parameter, comprising
means for generating first and second light signals;
a transmit optical fiber having one and other ends thereof coupled to said generating means for receiving said first and second light signals, respectively;
a plurality of fiber optic sensors, each sensor being responsive to a physical parameter for sensing changes therein;
a plurality of first optically actuated optic switches connected in series in said transmit fiber, each of said first switches having an output connected to an input side of an associated sensor and being responsive to said first light signal for connecting said second light signal to said sensors; and
means for monitoring output signals from said sensors to detect changes in the physical parameter.

17. Apparatus according to claim 16 wherein said first light signal is a first train of first light signal pulses, said first optic switches being sequentially responsive to a first light pulse traveling in one direction on said transmit fiber for passing to the associated sensor a second light signal that is simultaneously present on said transmit fiber at said first switch.

18. Apparatus according to claim 17 wherein said second light signal is a second train of second light signal pulses, said first optic switches being sequentially responsive to a first light pulse traveling in the one direction on said transmit fiber for passing to associated sensors associated second light pulses traveling in the opposite direction on said transmit fiber and that are simultaneously present with said first pulse on said transmit fiber at associated first switches.

19. Apparatus according to claim 18 wherein said monitoring means comprises: second generating means producing a third train of third light signal pulses; a receive optical fiber having said third train of light pulses coupled to one end thereof; and a plurality of second optically actuated optic switches connected in series in said receive fiber and connected to output sides of associated sensors, said second switches being sequentially responsive to a third light pulse traveling in one direction on said receive fiber for sequentially passing from the associated sensor and onto said receive fiber a train of second light pulses.

20. Apparatus for sensing changes in a physical parameter, comprising
means for generating first and second light signals;
a transmit fiber having one and other ends thereof coupled to said generating means for receiving said first and second light signals, respectively;
a plurality of fiber optic sensor arrays, each sensor array being responsive to a physical parameter for sensing changes therein;
a plurality of first optically actuated optic switches connected in series in said transmit fiber, each of said first switches having an output connected to an input side of an associated sensor array and being responsive to said first light signal for connecting said second light signal to said sensor arrays; and means for monitoring output signals from said sensor arrays to detect changes in the physical parameter.

21. Apparatus according to claim 20 wherein said first light signal is a first train of first light signal pulses, said first optic switches being sequentially responsive to a first light pulse traveling in one direction on said transmit fiber for passing to the associated sensor array a second light signal that is simultaneously present on said transmit fiber at said first switch.

22. Apparatus according to claim 21 wherein said second light signal is a second train of second light signal pulses, said first optic switches being sequentially responsive to a first light pulse traveling in one direction on said transmit fiber for passing to associated sensor arrays associated second light pulses traveling in the other direction on said transmit fiber and simultaneously present with said first pulse on said transmit fiber at associated first switches.

23. Apparatus according to claim 22 wherein said monitoring means comprises: second generating means producing a third train of third light signal pulses; a receive fiber having said third train of light pulses coupled to one end thereof; and a plurality of second optically actuated optic switches connected in series in said receive fiber and connected to output sides of associated sensor arrays, said second switches being sequentially responsive to a third light pulse traveling in one direction on said receive fiber for sequentially passing from the associated sensor array and onto said receive fiber a train of second light pulses.

* * * * *